(12) United States Patent
Edwards et al.

(10) Patent No.: US 10,467,150 B2
(45) Date of Patent: Nov. 5, 2019

(54) DYNAMIC TIER REMAPPING OF DATA STORED IN A HYBRID STORAGE SYSTEM

(71) Applicant: International Business Machines Corporation, Armonk, NY (US)

(72) Inventors: Joseph R. Edwards, Rochester, MN (US); Robert Galbraith, Rochester, MN (US); Adrian C. Gerhard, Rochester, MN (US); Daniel F. Moertl, Rochester, MN (US); Gowrisankar Radhakrishnan, Colorado Springs, CO (US); Rick A. Weckwerth, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/981,163

(22) Filed: May 16, 2018

(65) Prior Publication Data

US 2018/0267902 A1    Sep. 20, 2018

Related U.S. Application Data

(63) Continuation of application No. 15/055,770, filed on Feb. 29, 2016.

(51) Int. Cl.
*G06F 12/00*       (2006.01)
*G06F 12/1009*     (2016.01)
*G06F 3/06*        (2006.01)

(52) U.S. Cl.
CPC ........ *G06F 12/1009* (2013.01); *G06F 3/0604* (2013.01); *G06F 3/067* (2013.01); *G06F 3/0611* (2013.01); *G06F 3/0649* (2013.01); *G06F 3/0659* (2013.01); *G06F 3/0664* (2013.01);

(Continued)

(58) Field of Classification Search
CPC .......................... G06F 12/1009; G06F 3/0604
See application file for complete search history.

(56) References Cited

U.S. PATENT DOCUMENTS

| 7,107,364 B2 | 9/2006 | Chen et al. |
| 7,539,782 B2 | 5/2009 | Davis et al. |
| 8,509,254 B2 | 8/2013 | Nemiroff et al. |

(Continued)

OTHER PUBLICATIONS

Appendix P; List of IBM Patents or Applications Treated as Related, May 16, 2018, 2 pages.

*Primary Examiner* — Baboucarr Faal
(74) *Attorney, Agent, or Firm* — Peter J. Edwards

(57) ABSTRACT

Disclosed are embodiments for supporting dynamic tier remapping of data stored in a hybrid storage system. One embodiment includes a storage controller and firmware, where the firmware maintains a plurality of mapping elements, where each mapping element includes a plurality of group identifiers, where each group identifier is configured to indicate a mapping of a logical block addresses, and where the storage controller performs: receiving a read command including a logical block address; parsing the logical block address to determine a mapping element and a group identifier; determining, for a particular mapping element of the plurality of elements, whether the particular mapping element is locked, wherein the particular mapping element corresponds to the mapping element of the logical block address; and dependent upon the particular mapping element, queuing the read command for firmware processing or remapping the logical block address.

17 Claims, 10 Drawing Sheets

(52) U.S. Cl.
CPC .......... *G06F 3/0683* (2013.01); *G06F 3/0685* (2013.01); *G06F 2212/65* (2013.01)

(56) References Cited

U.S. PATENT DOCUMENTS

| | | |
|---|---|---|
| 8,661,196 B2 | 2/2014 | Eleftheriou et al. |
| 8,667,219 B2 | 3/2014 | Eleftheriou et al. |
| 8,862,856 B2 | 10/2014 | Hall |
| 8,868,828 B2 | 10/2014 | Bakke et al. |
| 8,880,802 B1 | 11/2014 | Krishnamurthy et al. |
| 2012/0260055 A1 | 10/2012 | Murase |
| 2014/0365736 A1 | 12/2014 | Simionescu et al. |
| 2017/0249255 A1 | 8/2017 | Edwards et al. |

DYNAMIC TIER REMAPPING OF DATA STORED IN A HYBRID STORAGE SYSTEM

CROSS-REFERENCE TO RELATED APPLICATION

This application is a continuation application of and claims priority from U.S. patent application Ser. No. 15/055,770, filed on Feb. 29, 2016.

BACKGROUND

Field of the Invention

The field of the invention is data processing, or, more specifically, methods, apparatus, and computer program products for supporting dynamic tier remapping of data stored in a hybrid storage system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As one example of computer system advancement, data centers have been developed to provide storage and computation services on a massive scale over a network. Often, data centers provide cloud services and the data centers may include large numbers of storage devices. In some cases, the storage devices may be different types of storage devices, where the different types of storage devices may have different performance characteristics.

SUMMARY

Disclosed are embodiments for supporting dynamic tier remapping of data stored in a hybrid storage system. One example embodiment includes a hybrid storage system, where the hybrid storage system includes a storage controller and firmware, where the firmware maintains a plurality of mapping elements, where each mapping element including a plurality of group identifiers, each group identifier configured to indicate a mapping of a logical block addresses, the method comprising: receiving, by a storage controller, a read command including a logical block address; parsing, by the storage controller, the logical block address to determine a mapping element and a group identifier; determining, by the storage controller and for a particular mapping element of the plurality of elements corresponding to the mapping element of the logical block address, whether the particular mapping element is locked; if the particular mapping element is locked, queuing, by the storage controller, the read command for firmware processing; and if the particular mapping element is not locked, determining, by the storage controller, from the mapping element whether to modify the group identifier of the logical block address used in performing the read command.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Exemplary methods, apparatus, and computer program products for supporting dynamic tier remapping of data stored in a hybrid storage system in accordance with the present invention are described with reference to the accompanying drawings, beginning with FIG. 1.

Figure 1:
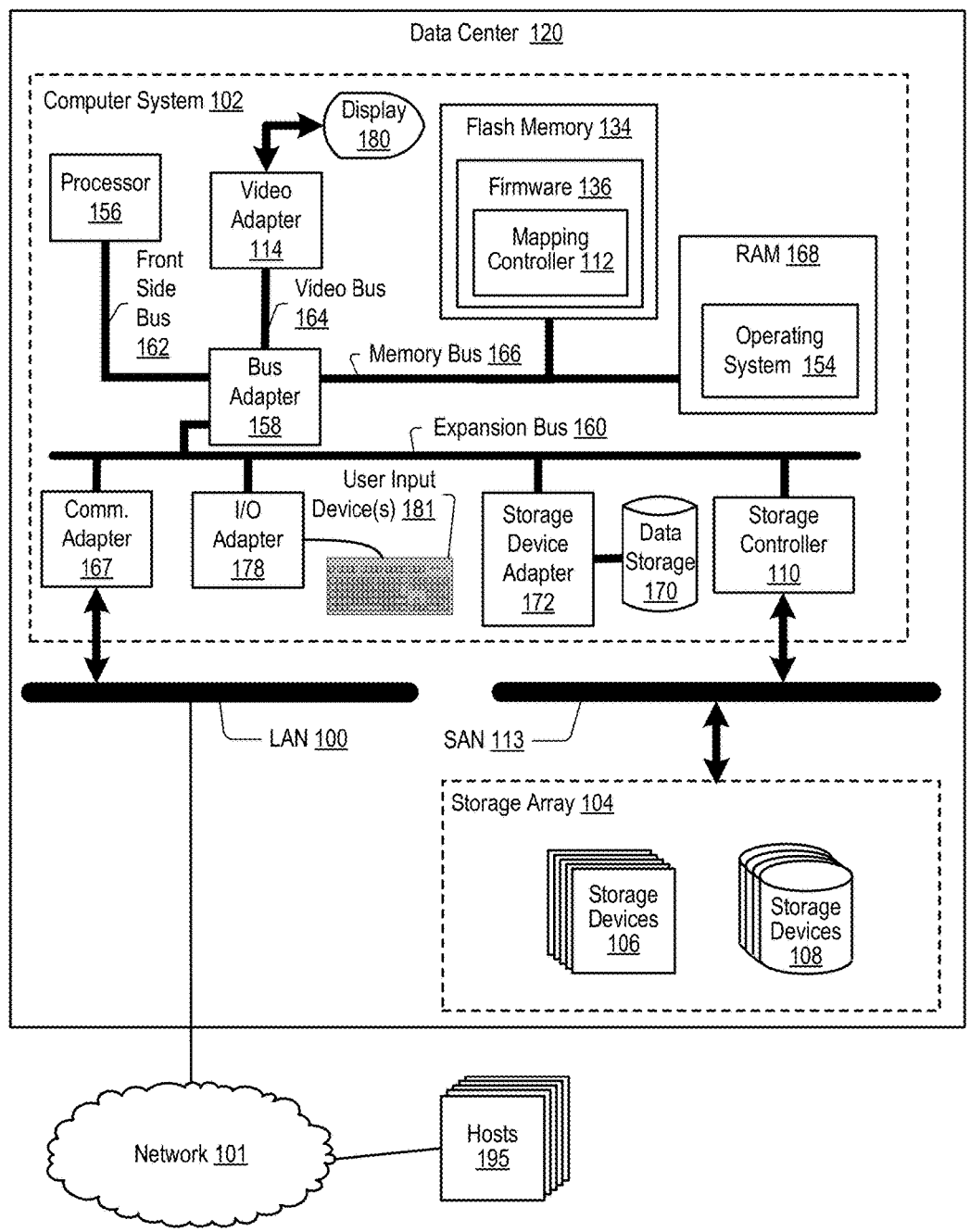
FIG. 1 sets forth a diagram of a data center that may include multiple computer systems, where an example computer system may be configured for supporting dynamic tier remapping of data stored in a hybrid storage system according to embodiments of the present invention.

FIG. 1 sets forth a diagram of a data center (120) that may include multiple computer systems, where an example computer system (102) may be configured for supporting dynamic tier remapping of data stored in a hybrid storage system according to embodiments of the present invention. The computer system (102) may include: a storage controller (110) which may be configured for supporting dynamic tier remapping of data stored in a hybrid storage system according to different embodiments; and a mapping controller (112), implemented within firmware (136) of the flash memory (134), where the mapping controller (112) may also be configured for supporting dynamic tier remapping of data stored in a hybrid storage system according to different embodiments.

In some embodiments, a computer system (102) may communicate with a storage array (104) via a storage area network (113), where the storage array (104) may include multiple, different types of storage devices (106, 108). In some cases, the storage devices (106, 108) may have different performance characteristics and be classified as belonging to different storage tiers. For example, a first set of storage devices (106) may be solid state storage devices and a second set of storage devices (108) may be hard disk drives. In other examples, the storage devices (106, 108) may be other types of storage devices, and storage array (104) may include other types of storage devices in addition to storage devices (106) and storage devices (108).

In some embodiments, the different types of storage devices may store data with different types of access patterns. For example, one data region in one type of storage device may store memory that goes from being infrequently accessed to being frequently accessed. Further in this example, the one type of storage device may be a storage device with performance characteristics that are slower than another storage device in the storage array. In such a situation, performance for memory operations may be improved if the frequently accessed data on the one type of storage device were moved to a higher performing storage device. In other words, data may be moved from one storage tier to another storage tier in accordance with access patterns of the data and in accordance with performance characteristics of storage devices in a storage tier.

In some embodiments, the computer system (102) may track access statistics for different data stored on different devices in the storage array (104). These access statistics may be used to improve performance characteristics of memory operations by being a basis for moving, or swapping, frequently accessed data from slower performing storage devices to higher performing storage devices. In some embodiments, the storage controller (110) may operate in conjunction with the mapping controller (112)—where the storage controller (110) may be implemented with combinations of hardware components, circuits, or devices, and where the mapping controller (112) may be implemented with firmware instructions stored in the firmware (136). In some implementations, both the storage controller (110) and the mapping controller (112) may be implemented using software modules.

In some embodiments, the architectural configuration of the storage array (104) may be specified according to different types of designs. For example, storage array (104) may be configured to implement a redundant array of independent devices (RAID), RAID 5/6/10 including RAID 5T2/6T2/10T2, among any other type of RAID system. In other examples, storage array (104) may be configured to implement a different type of storage architecture.

Generally, the computer system (102) may be implemented to improve memory operation performance in any storage array (104) that includes different types of storage devices, or different tiers of storage devices, such that performance of a memory operation on a particular block or band of data may be improved dependent upon a move of the block or band of data from a slower performing storage device to a higher performing storage device. In different embodiments, a block or band of data may be specified to be any number of bytes of data.

In some embodiments, a band of data may be mapped to a particular storage device among the storage devices of storage array (104), where the band of data may be referenced by parsing a logical block address received in a memory operation request. Further in this example, a band of data may be moved from one storage device to another storage device by remapping a logical block address to refer to a different storage device from a previous storage device. In some examples, the transfer of a band of data may be performed by the firmware mapping controller (112), and mapping information for given logical block addresses may be maintained by the firmware mapping controller (112) within a mapping element table.

In some embodiments, as noted above, a band of data may be referenced using logical block addresses, where a logical block address may include a group identifier, a mapping element for identifying a band of data, and a band offset. In some embodiments, the group identifier may identify a particular storage device or storage tier among the storage devices of the storage array (104).

In this embodiment, a remapped logical block address may be generated by replacing a group identifier of the logical block address received with a memory operation request with a different group identifier—where the group identifier mappings may be maintained in a mapping element table entry that may be indexed using a mapping element portion of the incoming logical block address.

In this way, based at least in part on the mapping element portion of the logical block address, the mapping element table may be indexed to determine a list of group identifier entries—where the list of group identifier entries may be indexed based at least on the group identifier from the received logical block address to determine a group identifier for a remapped band of data. In this way, the remapped logical block address may be used to reference the current location for a band of data, where the current location for the band of data may be in a different storage tier. Further, in some embodiments, the generated logical block address may refer to a remapped block of data or may refer to an originally mapped storage location for the band of data, depending on whether or not the band of data has been moved.

The exemplary data center (120) and computer system (102) are for purposes of illustration, not for limitation. In other words, the arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Supporting dynamic tier remapping of data stored in a hybrid storage system in accordance with the present invention is generally implemented with computers, that is, with automated computing machinery. In the system of FIG. 1, for example, the computer system (102) is implemented to some extent at least as computers. For further explanation, therefore, FIG. 1 sets forth a block diagram of automated computing machinery comprising an exemplary computer system (102) configured for supporting dynamic tier remapping of data stored in a hybrid storage system according to embodiments of the present invention. The computer system (102) includes at least one computer processor (156) or "CPU" as well as random access memory (168) or "RAM," which is connected through a high speed memory bus (166) and bus adapter (158) to processor (156) and to other components of the computer system (102).

As illustrated in FIG. 1, stored in RAM (168) is an operating system (154). Operating systems useful in computers configured for supporting dynamic tier remapping of data stored in a hybrid storage system according to embodiments of the present invention include UNIX™, Linux™, Microsoft XP™, AIX™, IBM's i5/OS™, and others as will occur to those of skill in the art. The operating system (154) is shown in RAM (168), but many components of such software typically are stored in non-volatile memory also, such as, for example, on a data storage (170) device.

The computer system (102) may also include a storage device adapter (172) coupled through expansion bus (160) and bus adapter (158) to processor (156) and other components of the computer system (102). Storage device adapter (172) connects non-volatile data storage to the computer system (102) in the form of data storage (170). Storage device adapters useful in computers configured for balancing utilization of infrastructure in a networked computing environments according to embodiments of the present invention include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The exemplary computer system (102) may also include a communications adapter (167) for data communications with other computers (195) or devices, including local area network (LAN) (100), and for data communications with a data communications network, such as network (101). Such data communications may be carried out serially through RS-232 connections, through external buses such as a Universal Serial Bus ("USB"), through data communications networks such as IP data communications networks, and in other ways as will occur to those of skill in the art. Communications adapters may implement the hardware level of data communications through which one computer sends data communications to another computer, directly or through a data communications network. Examples of communications adapters useful in computers configured for balancing utilization of infrastructure in a networked computing environments according to embodiments of the present invention include modems for wired dial-up communications, Ethernet (IEEE 802.3) adapters for wired data communications, and 802.11 adapters for wireless data communications.

Figure 2A:
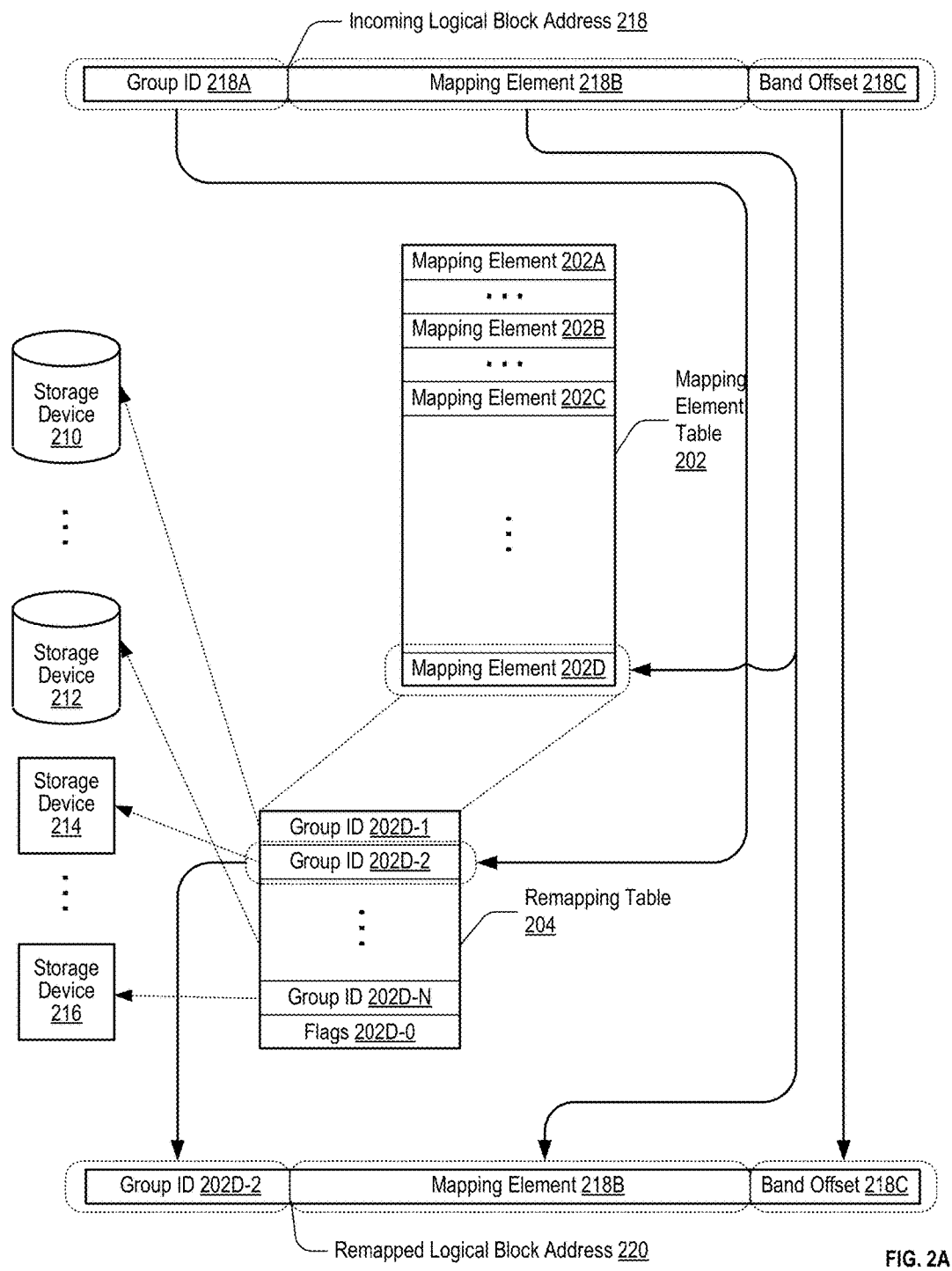
FIGS. 2A-2C set forth illustrations of aspects and uses of logical block addresses received in a memory operation, including remapping of a logical block address, a mapping element table, a remapping table, a mapping element statistics table, a group access statistics table, and storage devices of the storage array, according to embodiments of the present invention.
Figure 2B:
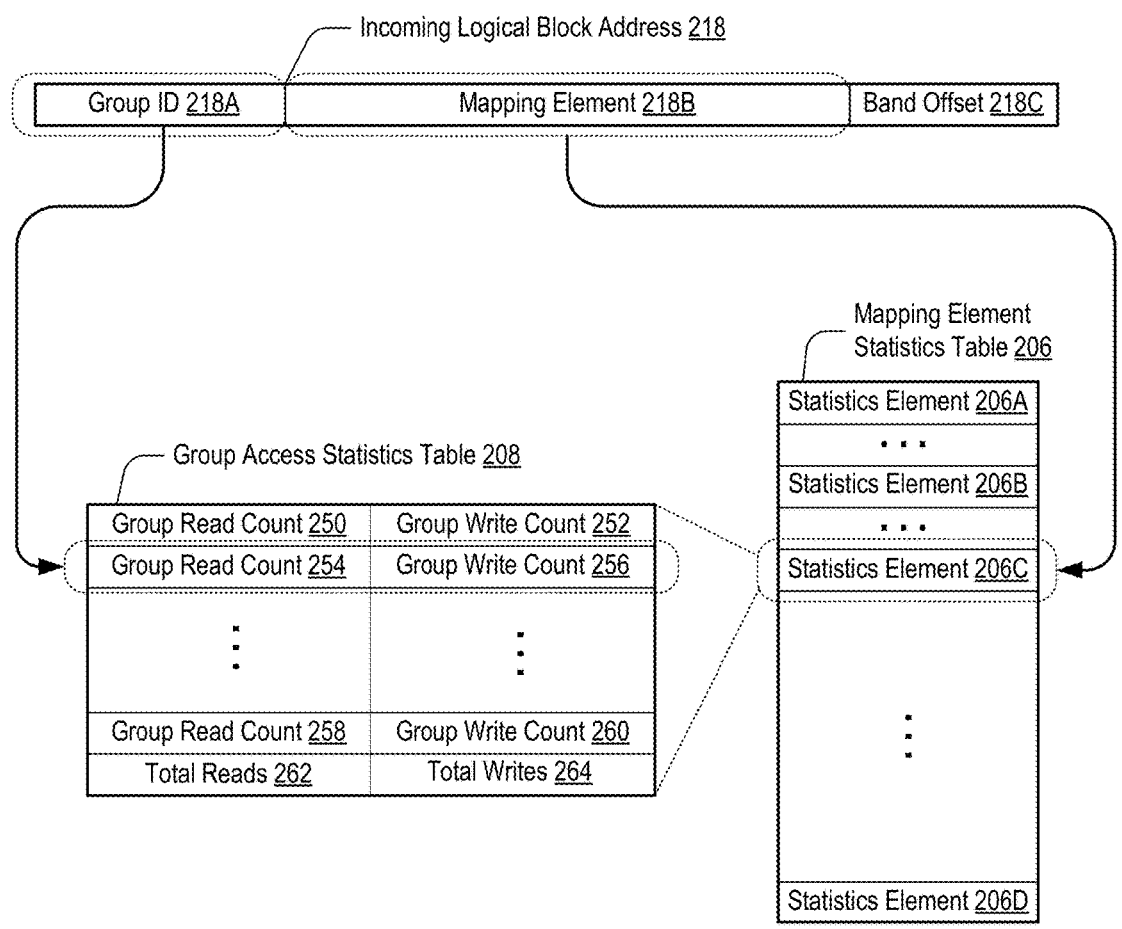
Figure 2C:
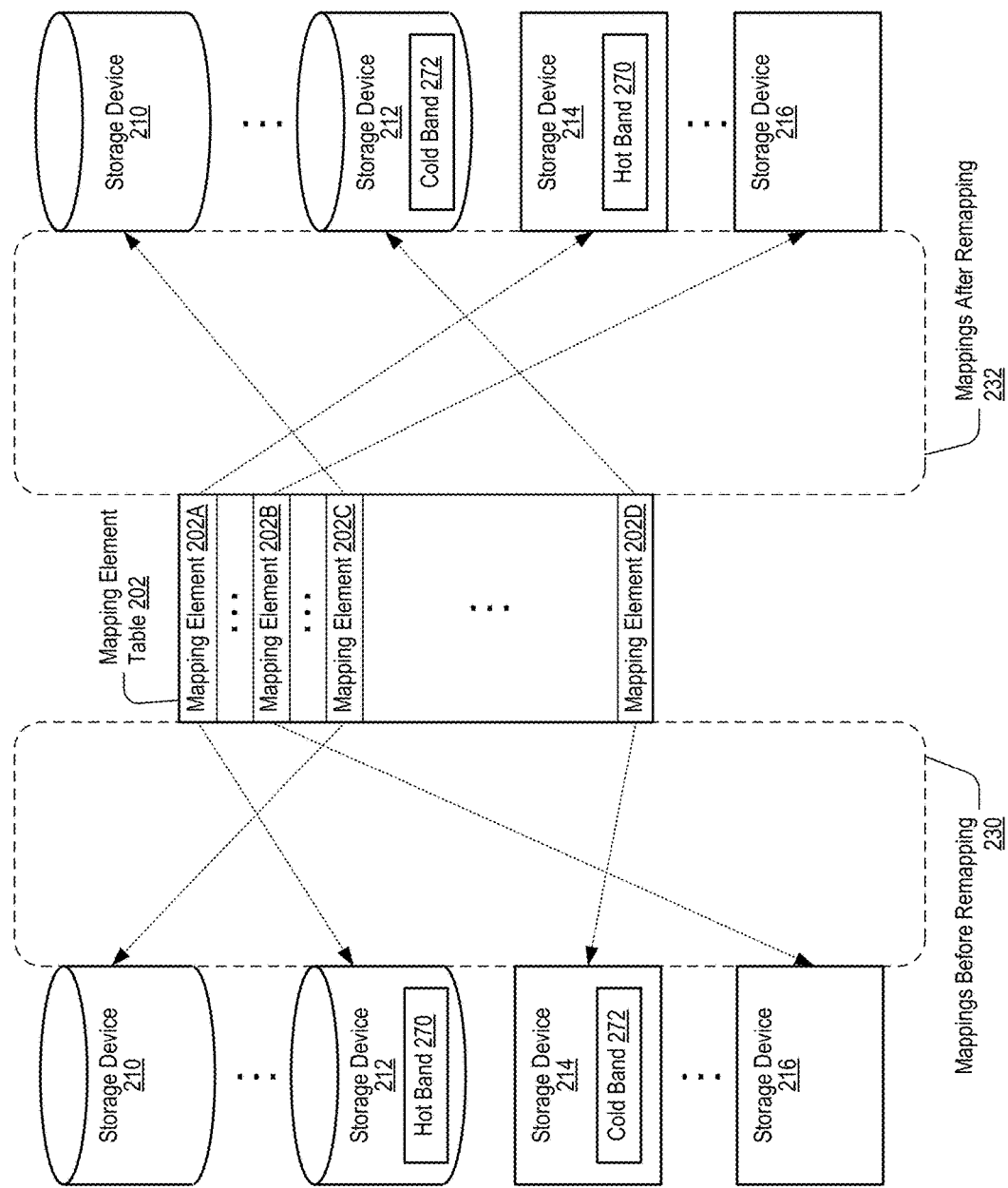

FIGS. 2A-2C, for further explanation, set forth illustrations of aspects and uses of logical block addresses received in a memory operation, including remapping of a logical block address (218), a mapping element table (202), a remapping table (204), a mapping element statistics table (206), a group access statistics table (208), and storage devices (210, 212, 214, 216) of the storage array (104).

As depicted in FIG. 2A, a logical block address (218) may include various component fields, including a group identifier (ID) (218A), a mapping element (218B), and a band offset (218C). In some embodiments, the group identifier may specify a particular storage tier from among a plurality of different storage tiers, and the band offset may be used to index into a band of data referenced by the logical block address. In some embodiments, the logical block address (218) may be received by storage controller (110) as a parameter of a memory operation request, such as a read command. In some embodiments, the logical block address (218) may include more or fewer fields, with varying numbers of bits for specifying each field.

In this example, a remapped logical block address (220) may be generated by storage controller (110) based on mapping data stored within the mapping element table (202) and the remapping table (204). For example, the logical block address (218) may be parsed by the storage controller (110) to determine the mapping element (218B) of the logical block address, where the mapping element (218B) may be used to index into the mapping element table (202).

In this example, indexing the parsed mapping element (218B) references mapping element (202D) of the mapping element table (202). Further in this example, the mapping element (202D) may include a list of group identifiers (202D-1-202D-N) and an entry for control flags (202D-0). Continuing with this example, the list of group identifiers in the remapping table (204) may be indexed based on the parsed group identifier (218A) of the received logical block address (218) to determine a group identifier to use in the remapped logical block address (220). In this case, the storage controller (110) uses the group identifier (218A) to index into the remapping table (204) to determine group identifier (202D-2)—where the storage controller (110) uses group identifier (202D-2) of the remapping table (204) to replace group identifier (218A) of the received logical block address (218) in order to generate the remapped logical block address (220), which includes group identifier (202D-2), mapping element (218B), and band offset (218C).

In this way, the storage controller (110) may use the received logical block address (218) to generate a remapped logical block address (220), where the remapped logical block address references the current storage location, or storage tier, for the band of data specified in the received memory operation.

Further depicted in FIG. 2A are storage devices corresponding to particular mapping element entries of the mapping element table (202), where in this example mapping element (202A) maps to storage device (212), mapping element (202B) maps to storage device (216), mapping element (202C) maps to storage device (210), and mapping element (202D) maps to storage device (214).

In some embodiments, the mapping element table (202) is maintained and writeable by the firmware mapping controller (112) and read only to the hardware storage controller (110).

FIG. 2B, for further illustration, depicts the mapping element statistics table (206) and the group access statistics table (208). In some embodiments, the storage controller (110) may track access activity for memory operations performed. For example, the storage controller (110) may maintain the mapping element statistics table (206), where the mapping element statistics table (206) may include an entry corresponding to, and indexed by, the mapping element portion of a logical block address, which in this case, is mapping element (218B).

Generally, the mapping element statistics table (206) may include multiple statistics elements that correspond, respectively, to multiple mapping element values, where each statistics element may include a group access statistics table, such as the group access statistics table (208). In this example, the group access statistics table (208) corresponds to statistics element (206C), which corresponds to mapping element (218B)—where the group access statistics table (208) may include a counter for read operations and write operations for each group identifier. The group access statistics table (208) includes group read counts (250, 254, 258, 262) and group write counts (252, 256, 260, 264). Further in this example, similar to the mapping element table (202), the mapping element statistics table (206) may include a table entry for each mapping element—in this example, these table entries include statistics element (206A-206D). Continuing with this example, the mapping element statistics table (206), for each mapping element, includes a table entry that includes a group access statistics table, such as group access statistics table (208).

In some embodiments, the storage controller (110) may, on receipt of a memory operation command or upon completion of a memory operation command, update a count of the type of memory operation performed for the group identifier of the logical block address associated with the memory operation.

As discussed below, the storage controller (110) may, in response to a total read count exceeding a threshold, generate an event, or interrupt, to the firmware mapping controller (112) so that the firmware mapping controller (112) may determine whether or not to swap a band of data from one storage tier to another storage tier. In some embodiments, the threshold may be specified within a dedicated register writeable by the firmware mapping controller (112) and readable by the storage controller (110).

FIG. 2C, for further illustration, depicts mappings from mapping elements in the mapping element table (202) to storage devices after an example move, or swap, of bands of data stored on two different storage devices, where the different storage devices are in different tiers. In this example, at a particular point in time before a band swap, mapping element (202A) is mapped to storage device (212), mapping element (202B) is mapped to storage device (216), mapping element (202C) is mapped to storage device (210), and mapping element (202D) is mapped to storage device (214).

In this example, the storage controller (110), based at least on exceeding a threshold as reflected by access statistics in the mapping element statistics table (206), may notify the firmware mapping controller (112) that a statistical count has exceeded the threshold value, and where the firmware mapping controller (112) may determine whether to move, or swap, one or more bands of data.

As depicted in FIG. 2C, mapping element (202A) of the mapping element table (202) is mapped to, or references, storage device (212), where storage device (212) stores a band of data, hot band (270), and where the hot band (270) has been accessed a sufficient number of times such that the storage controller (110) has generated an interrupt to the firmware controller (112).

In this example, the firmware controller (112), upon receiving the statistics based interrupt, analyzes one Group Access Statistics Table (208) of the Mapping Element Statistics table (206) and determines to swap the hot band (270) of data to a higher storage tier. In this example, the storage controller (110) may determine a band of data in the higher storage tier to swap into a lower storage tier based on the band of data being accessed infrequently, or relatively less frequently than the hot band (270) of data. In this example, the storage controller (110) may determine that cold band (272) of data has access statistics rendering the cold band (272) of data a good candidate to be swapped out to a lower storage tier. In some embodiments, the cold band (272) may have the lowest, or near lowest, access statistics within a particular storage tier, or within a particular storage device.

In this example, after the firmware mapping controller (112) determines the hot band (270) and cold band (272) to swap, the firmware mapping controller (112) may move hot band (270) from storage device (212) to storage device (214), and move cold band (272) from storage device (214) to storage device (212). Further in this example, the firmware mapping controller (112) may update the mapping elements table (202) to reflect the new locations of the swapped bands of data.

As illustrated in FIG. 2C, the mappings before the swap of hot band (270) and cold band (272) are depicted by the mappings before remapping (230), and the mappings after the swap of hot band (270) and cold band (272) are depicted by the mappings after remapping (232).

Completing this example, after the band swap of hot band (270) with cold band (272), mapping element (202A) is mapped to storage device (214), mapping element (202B) is mapped to storage device (216), mapping element (202C) is mapped to storage device (210), and mapping element (202D) is mapped to storage device (212).

Figure 3A:
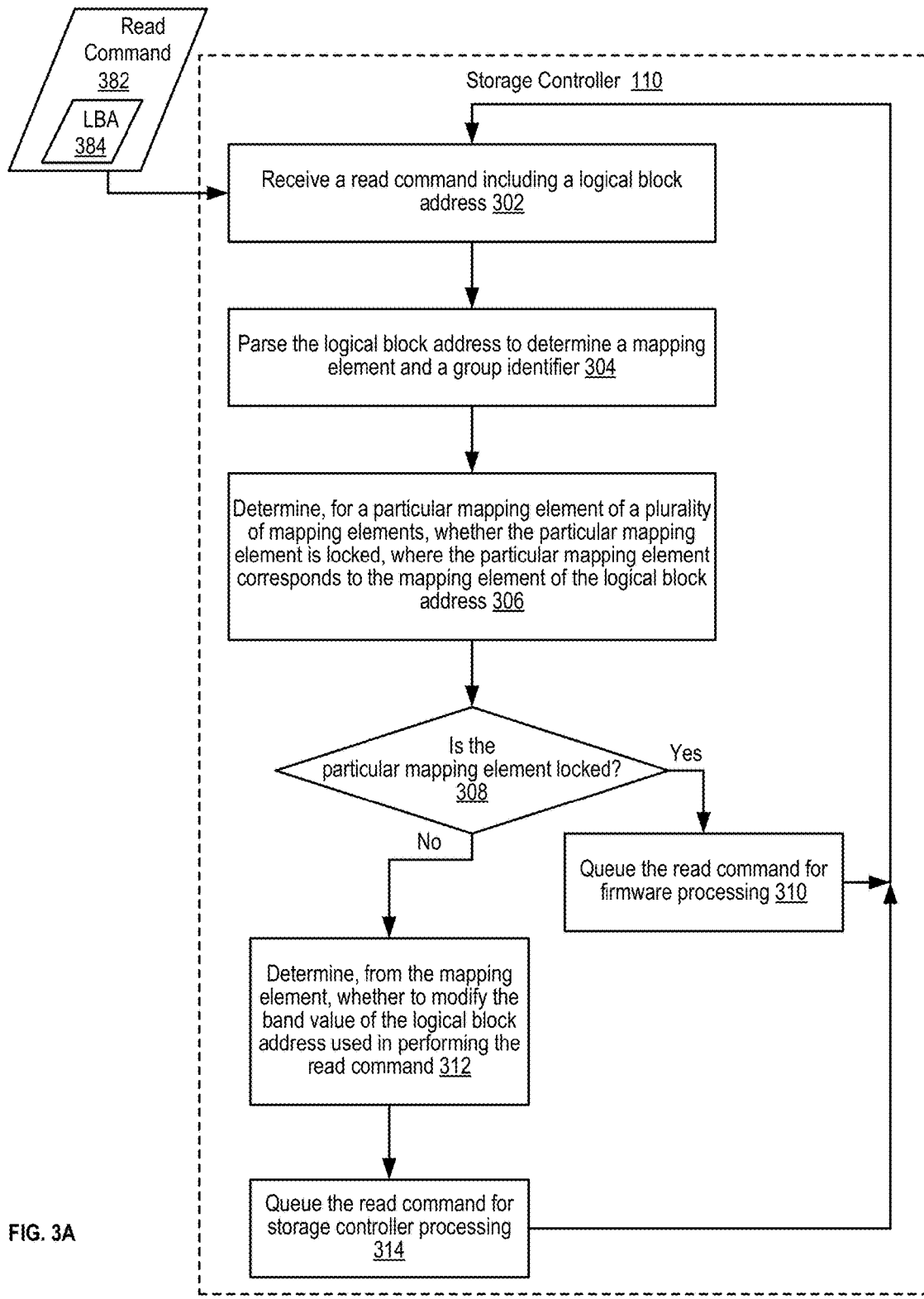
FIG. 3A, sets forth a flow chart illustrating an exemplary method for supporting dynamic tier remapping of data stored in a hybrid storage system according to embodiments of the present invention.

FIG. 3A, for further explanation, sets forth a flow chart illustrating an exemplary method for supporting dynamic tier remapping of data stored in a hybrid storage system according to embodiments of the present invention. The method of FIG. 3A may be carried out by the storage controller (110) within the computer system (102).

In this example, the hybrid storage system includes computer system (102) and storage array (104), where the hybrid storage system may include the storage controller (110) of computer system (102), which further includes a firmware mapping controller (112) maintaining a plurality of mapping elements. Further in this example, each mapping element may include a plurality of group identifiers, where each group identifier may be configured to indicate a mapping of a logical block address.

Further, in this example, the method of FIG. 3A includes: receiving (302), by the storage controller (110), a read command (382) including a logical block address (384); parsing (304), by the storage controller (110), the logical block address (384) to determine a mapping element and a group identifier; determining (306), by the storage controller (110) and for a particular mapping element of the plurality of elements corresponding to the mapping element of the logical block address (384), whether the particular mapping element is locked; if (308) the particular mapping element is locked, queuing (310), by the storage controller (110), the read command for firmware processing; and if (308) the particular mapping element is not locked, determining (312), by the storage controller (110), from the mapping element whether to modify the group identifier of the logical block address used in performing the read command.

Further, in this example, if (308) the particular mapping element is not locked, then after the storage controller (110) determines (312) whether to modify the group identifier of the logical block address, the storage controller (110) may queue (314) the read command (382) for processing by the storage controller (110), and proceed to wait to receive additional memory operation requests.

In some embodiments, receiving (302) the read command may be carried out by the computer system (102) receiving a memory operation from a host device, and where the computer system (102) may invoke the storage controller (110) to process the read command.

In some embodiments, parsing (304) the logical block address (384) may be carried out by the storage controller (110) determining the group identifier bits, the mapping element bits, and the band offset bits of the received logical block address (384). Further, the determining (306) may be carried out by the storage controller indexing the mapping element table (202) with the group identifier of the logical block address (384) to determine the particular mapping element from among the plurality of elements of the mapping element table (202). In this example, the storage controller (110) may then read the control flags value, such as the flags (202D-0) in FIG. 2A, of the remapping table, such as the remapping table (204) in FIG. 2A, for the particular mapping element to determine whether or not a lock bit for the particular mapping element has been set. In some cases, the firmware mapping controller (112) may set and clear the lock bit within the particular mapping element based on whether a move, or swap is being performed for a group within the particular mapping element.

Further, in this example, the storage controller (110) may index the remapping table (204) with the group identifier of the received logical block address to determine a mapping value, or remapping value, to be used as a group identifier value for a remapped logical block address, as depicted in FIG. 2A.

In this way, in this example, the storage controller (110), using hardware components, may continue to receive and process memory operations that are directed to bands of data that are not being currently moved or swapped by the firmware mapping controller (112). In other words, if a memory operation is received for a mapping element that is currently locked by the firmware mapping controller (112), then the storage controller (110) does not process the memory operation, and instead queues (310) the memory operation for processing by the firmware mapping controller (112) after the firmware mapping controller (112) completes a move or swap of a band or bands of data.

Figure 3B:
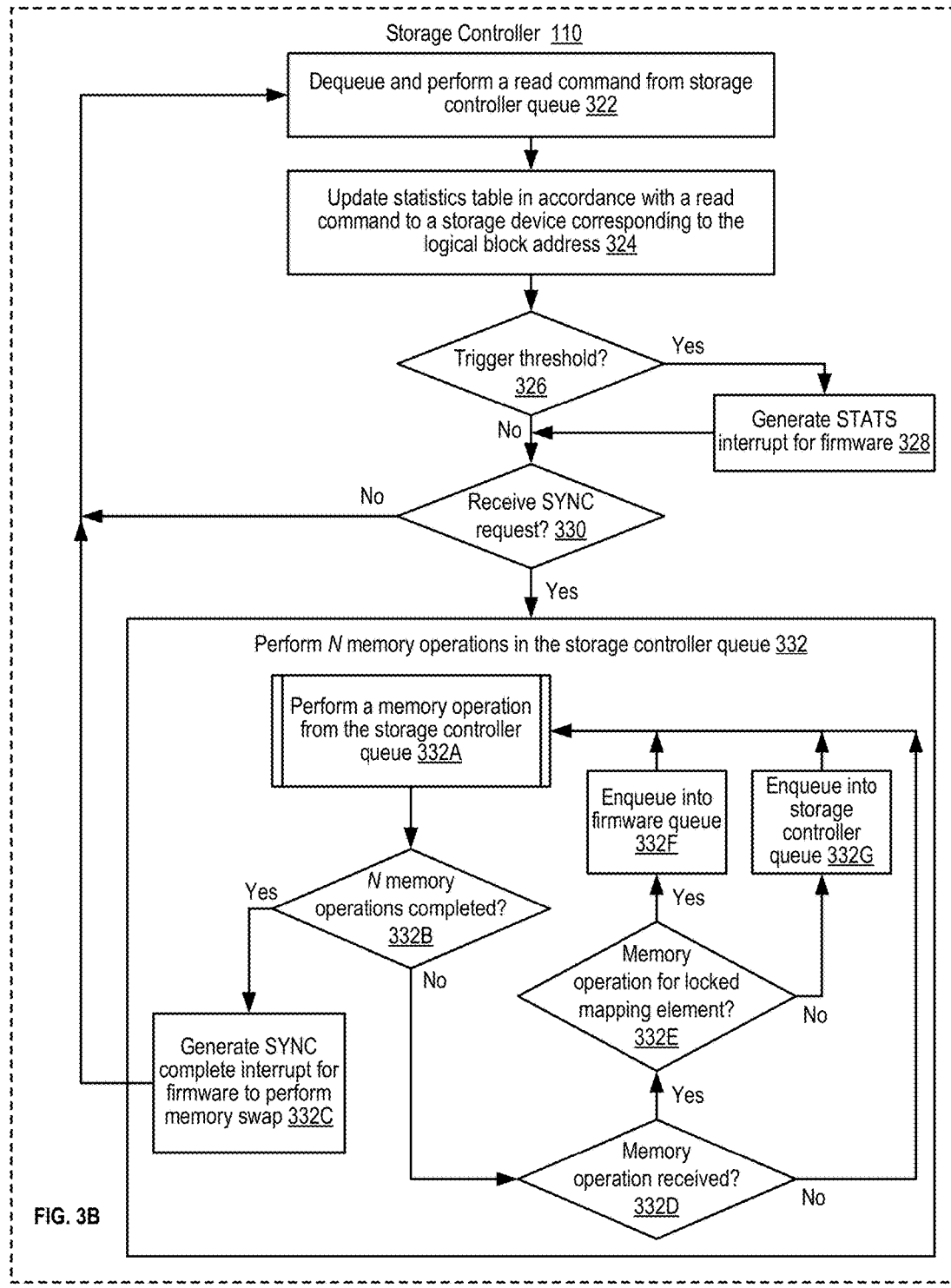
FIG. 3B sets forth a flow chart illustrating an exemplary method for supporting dynamic tier remapping of data stored in a hybrid storage system according to embodiments of the present invention.

FIG. 3B, for further explanation, sets forth a flow chart illustrating an exemplary method for supporting dynamic tier remapping of data stored in a hybrid storage system according to embodiments of the present invention. The method of FIG. 3B may be carried out by the storage controller (110) within the computer system (102).

For context, the method described above with regard to FIG. 3A is with regard to the storage controller (110) receiving memory operations and determining whether or not to queue the memory operation for handling by the firmware mapping controller (112) or to queue the memory operation for handling by the hardware of the storage controller (110)—where if the mapping element for the logical block address of the received memory operation indicates a locked status, then the storage controller (110) queues the memory operation for processing by the firmware mapping controller (112), and otherwise queues, after remapping the logical block address, the memory operation for handling by the hardware of the storage controller (110).

To continue with this example, the steps of FIG. 3B describe the process of dequeueing and performing the received memory operations—where this thread of hardware execution for FIG. 3B may be performed in parallel with the thread of hardware execution for the method of FIG. 3A.

As depicted in FIG. 3B, the storage controller (110) may dequeue (322) and perform a read command, or generally any memory operation, from the storage controller queue. In some embodiments, the storage controller queue may be implemented using different techniques, including specifying a set of registers, a set of memory mapped registers, or a region of memory for specifying respective memory operations—in other words, a queue that is specified with hardware components as opposed to software data structures.

In this embodiment, once an memory operation is in flight, or begun to be processed, the storage controller (110) may update (324) the mapping element statistics table to reflect performance of the memory operation. This update (324) may be carried out by the storage controller parsing the logical block address for the dequeued memory operation, determining a grouping identifier and a mapping element, and indexing the mapping element statistics table using the mapping element to determine a particular statistics element, and indexing a group access statistics table corresponding to the particular statistics element using the grouping identifier to determine a particular group for which to update a count of memory operations performed, including updating a total count for the particular memory operation performed.

In this embodiment, the storage controller (110), after updating a total count for a particular type of memory operation, may determine whether or not the total count exceeds a trigger threshold (326), where the threshold may be specified by the firmware mapping controller (112). In this embodiment, if the storage controller (110) determines that the threshold has been exceeded, then the storage controller (110) may generate (328) an interrupt, such as a STATS interrupt corresponding to a statistical event, where the interrupt is directed toward the firmware mapping controller (112).

In this embodiment, if the threshold is not exceeded, the storage controller (110) may determine whether an interrupt from the firmware mapping controller (112) has been received (330), where the interrupt from the firmware mapping controller (112) is generated after the firmware mapping controller (112) responds to the STATS interrupt and determines to initiate a band swap—in which case, the firmware mapping controller (112) may set a lock flag in the mapping element entry of the mapping element table (204) to inform the storage controller (110) to process currently in flight, or queued, memory operations with current mapping values, and to not process any additionally received memory operations for the locked mapping element until the firmware mapping controller (112) generates an interrupt for the storage controller (110) that the band swap is complete and that received memory operations for the mapping element may again be processed by the hardware of the storage controller (110).

In this embodiment, if the storage controller (110) determines that no SYNC request interrupt has been generated and received (330) from the firmware mapping controller (112), then the storage controller (110) continues processing memory operations and proceeds to dequeue (322) and perform another memory operation.

Otherwise, in this embodiment, if the storage controller (110) determines that a SYNC interrupt has been received (330) from the firmware mapping controller (112), then the storage controller (110) may complete processing for all currently queued, or in flight, memory operations with current mapping values before informing the firmware memory controller (112) that a band swap may be performed and the current mapping values may be updated. In this example, the storage controller (110) may perform (332) all N memory operations in the hardware queue, where the processing of the current N memory operations includes: performing (332A) a memory operation from the hardware queue; if the memory operation was the Nth memory operation (332B), then the storage controller (110) may generate (332C) a SYNC complete interrupt for the firmware mapping controller (112) so that the firmware mapping controller (112) may proceed to process memory operations in the firmware mapping controller queue, and after generating the SYNC complete interrupt, the storage controller (110) may proceed to dequeue (322) and process any memory operations that have been received; otherwise, if the memory operation was not the Nth memory operation (332B), then the storage controller (110) may determine whether another memory operation has been received (332D); if no memory operation has been received (332D), then the storage controller (110) may proceed to perform (332A) another memory operation from the hardware storage controller queue; otherwise, if a memory operation has been received (332D), then the storage controller (110) may determine whether the received memory operation has a logical block address with a locked mapping element (332E); if the received memory operation has a logical block address with a locked mapping element (332E), then the storage controller (110) enqueues (332F) the received memory operation for processing by the firmware mapping controller (112), and proceeds to perform (332A) another memory operation from the hardware storage controller (40) queue; otherwise, if the received memory operation has a logical block address with an unlocked mapping element (332E), then the storage controller (110) enqueues (332G) the received memory operation for processing by the hardware of the storage controller, and proceeds to perform (332A) another memory operation from the hardware storage controller queue.

In this way, once the firmware mapping controller (112) informs the storage controller (110) that a band swap is to be performed, the storage controller (110) may continue hardware processing any additionally received memory operations that are directed to unlocked mapping elements without any dependence or delays due to waiting for the firmware mapping controller (112) to complete a band swap.

In some embodiments, the storage controller (110) may, instead of performing all N memory operations currently in flight, as described above, the storage controller (110) may perform all operations that are directed to the mapping element corresponding to the band of data being swapped. However, in this implementation, additional information may need to be stored and processed to identify which of the currently queued memory operations have logical block addresses corresponding to the mapping element.

Figure 3C:
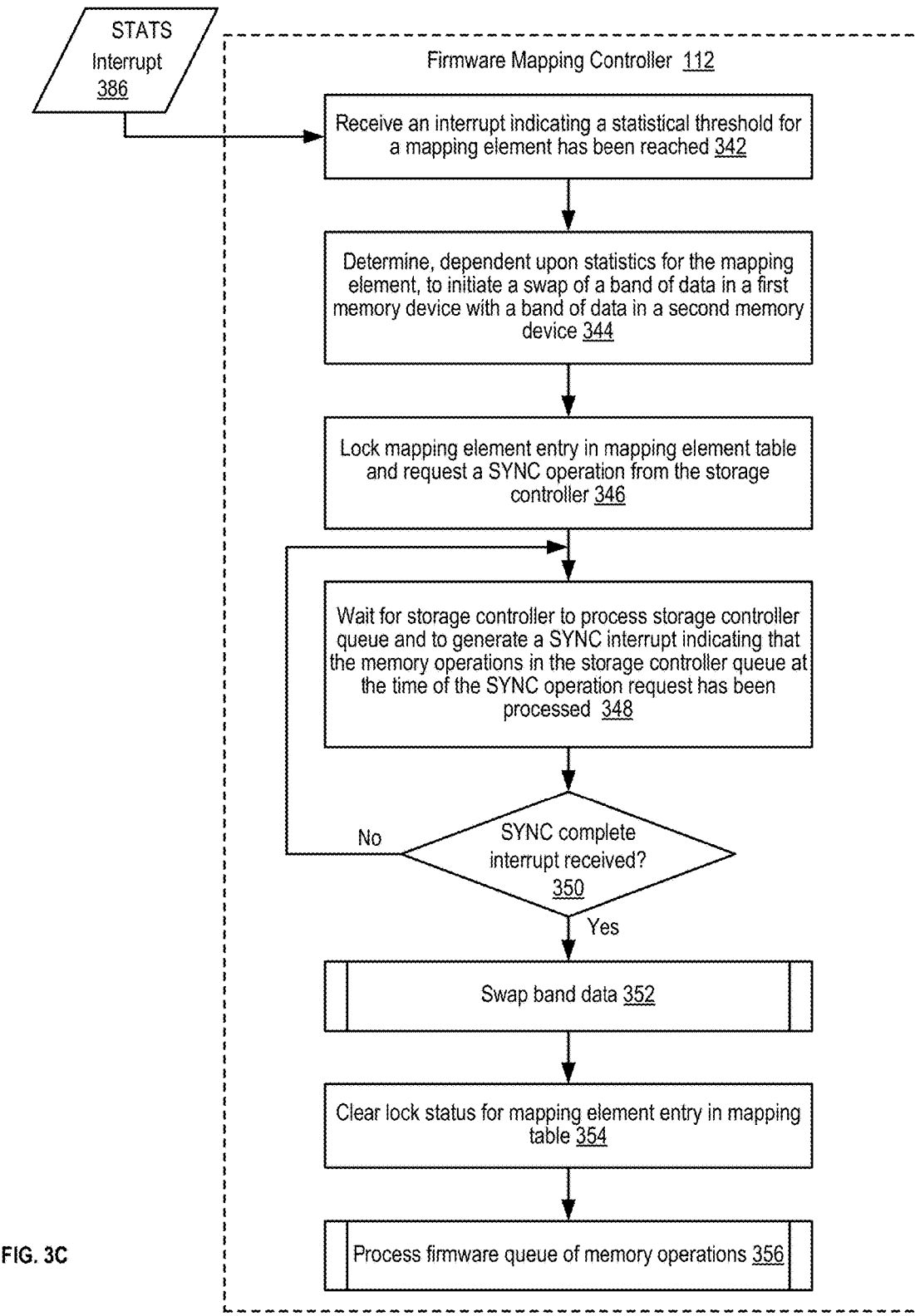
FIG. 3C sets forth a flow chart illustrating an exemplary method for supporting dynamic tier remapping of data stored in a hybrid storage system according to embodiments of the present invention.

FIG. 3C, for further explanation, sets forth a flow chart illustrating an exemplary method for supporting dynamic tier remapping of data stored in a hybrid storage system according to embodiments of the present invention. The method of FIG. 3C may be carried out by the firmware mapping controller (112) within the computer system (102).

For context, the methods described above with regard to FIGS. 3A and 3B are with regard to hardware execution threads of the storage controller (110)—where one hardware execution thread receives and queues memory operations and another hardware execution thread dequeues and performs the memory operations.

In this embodiment, the firmware mapping controller (112) may receive (342) a STATS interrupt (386) indicating a statistical threshold for a mapping element has been reached, for example the STATS interrupt generated at (328) of FIG. 3B; the firmware mapping controller (112) may then determine (344), dependent upon statistics for the mapping element, to initiate a swap of a band of data in a first memory device with a band of data in a second memory device, for example, by referencing the mapping element statistics table and group access statistics table using the mapping element for which the STATS interrupt was generated; the storage controller may then determine to lock (346) the mapping element entry in the mapping element table and generate a SYNC operation from the storage controller so that the storage controller (110) may process all in flight memory operations with the unmodified mapping value for the mapping element; the firmware mapping controller (112) may then wait (348) for the storage controller (110) to process the hardware storage controller (110) queue, and for the storage controller to generate a SYNC complete interrupt indicating that the present memory operations have been completed; if the SYNC complete interrupt is not received, the firmware mapping controller (112) may continue to wait (348); otherwise, if the SYNC complete interrupt is received (350), then the firmware mapping controller (112) may proceed to swap (352) the band data, clear (354) the lock status for the mapping element entry in the mapping table, and process (356) any memory operations in the firmware queue.

Figure 4:
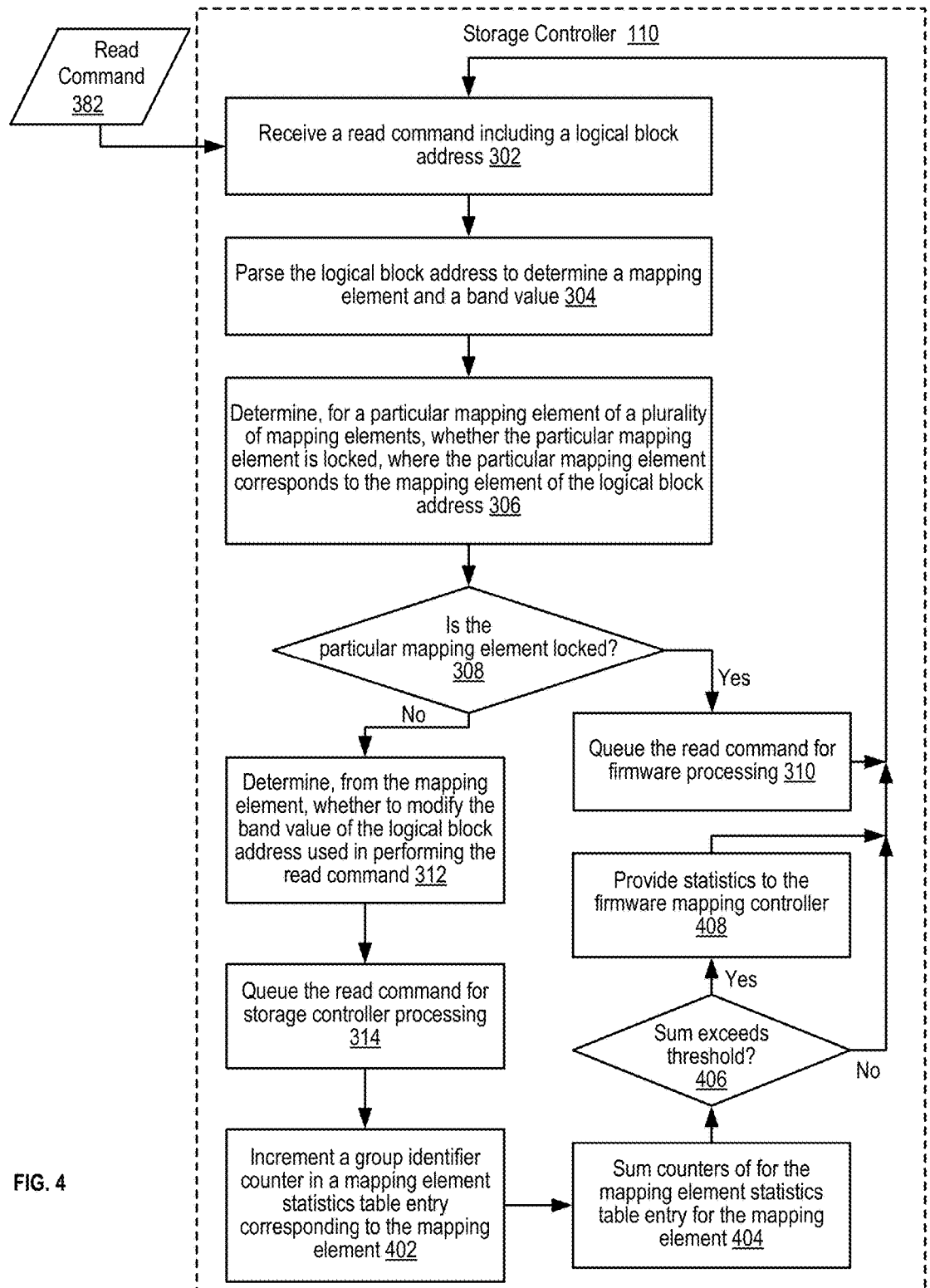
FIG. 4 sets forth a flow chart illustrating an exemplary method for supporting dynamic tier remapping of data stored in a hybrid storage system according to embodiments of the present invention.

FIG. 4, for further explanation, sets forth a flow chart illustrating an exemplary method for supporting dynamic tier remapping of data stored in a hybrid storage system according to embodiments of the present invention. The method of FIG. 4 may be carried out by the storage controller (110) within the computer system (102).

The exemplary method of FIG. 4 is similar to the method of FIG. 3A in that the method of FIG. 4 includes: receiving (302), by the storage controller (110), a read command (382) including a logical block address (384); parsing (304), by the storage controller (110), the logical block address (384) to determine a mapping element and a group identifier; determining (306), by the storage controller (110) and for a particular mapping element of the plurality of elements corresponding to the mapping element of the logical block address (384), whether the particular mapping element is locked; if (308) the particular mapping element is locked, queuing (310), by the storage controller (110), the read command for firmware processing; and if (308) the particular mapping element is not locked, determining (312), by the storage controller (110), from the mapping element whether to modify the group identifier of the logical block address used in performing the read command.

The method of FIG. 4 differs from the method of FIG. 3A, however, in that the method of FIG. 4 further includes: incrementing (402) a group identifier counter in a mapping element statistics table entry corresponding to the mapping element; summing (404) all counters for all group identifiers for the mapping element statistics table entry corresponding to the mapping element; if (406) the sum exceeds a threshold, then the storage controller (110) may provide (408) a copy of the mapping element statistics table entry corresponding to the mapping element to the firmware mapping controller (112), and proceed to receive (302) another read command; otherwise, if (406) the sum does not exceed the threshold, then the storage controller (110) may proceed to receive (302) another read command, without providing any statistics data to the firmware mapping controller (112).

In some embodiments, the incrementing (402) may be carried out by the storage controller indexing the mapping element statistics table using the mapping element parsed from the logical block address, and the indexed entry of the mapping element statistics table, which is a group access statistics table, may be indexed using the group identifier parsed from the logical block address. In some embodiments, the group access statistics table may maintain two counters for each group identifier, one counter for read commands and one counter for write commands, as depicted in FIG. 2B. In this example, for a read command, the read counter is incremented and updated within the group access statistics table entry corresponding to the group identifier.

In some embodiments, the summing (404) may be carried out by the storage controller summing each of the counter values for either all the read counters or all the write counters. However, in other embodiments, the total read count may also be incremented as each read command is processed, for example, by incrementing the total reads entry of the group access statistics table, where an example of the total reads entry is depicted in FIG. 2B, and in which case, the sum would be this total reads entry.

In some embodiments, the summing, by the storage controller (110) may include summing the counter values for each of the groups periodically upon a predefined, or specified number of memory operations for which the mapping element is not locked.

In some embodiments, the determining whether the sum exceeds a threshold (406) may be carried out by the storage controller (110) referencing a register that is writeable by the firmware mapping controller (112), where the firmware mapping controller may define a threshold value above which the storage controller (110) may generate an interrupt to the firmware mapping controller (112) to indicate that the threshold has been exceeded—where the firmware mapping controller (112) may respond by determining whether to initiate a band swap.

Further, the providing (408) may be carried out by the storage controller (110) writing the mapping element statistics table entry corresponding to the mapping element to one or more registers, or to a dedicated memory location, which is readable by the firmware mapping controller (112).

In this way, the firmware mapping controller (112) may use the mapping element statistics as a basis for determining whether to dynamically remap storage tiers so that frequently accessed bands of data are moved into a storage tier that has performance characteristics that may reduce delays in accessing the band of data.

Figure 5:
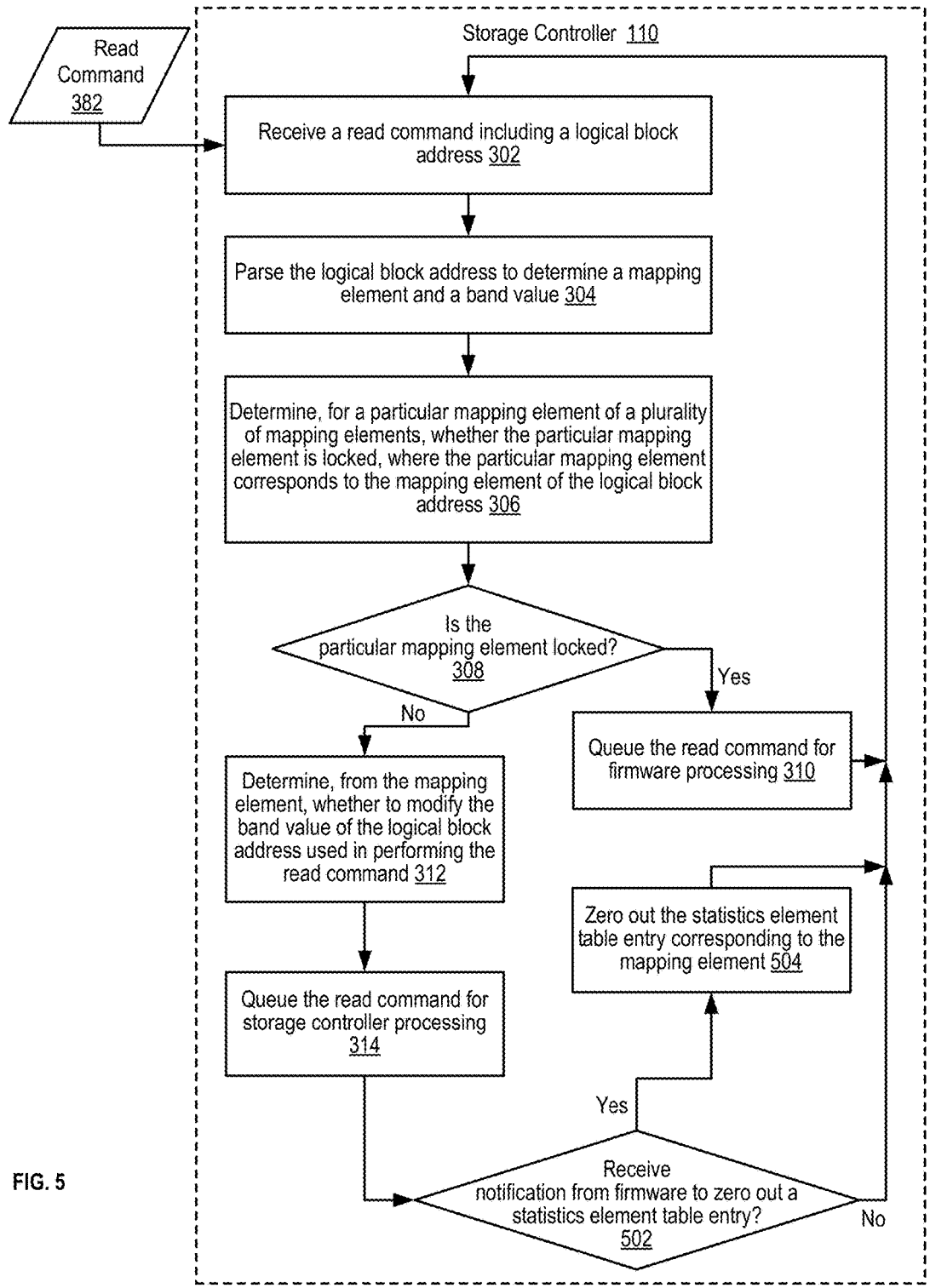
FIG. 5 sets forth a flow chart illustrating an exemplary method for supporting dynamic tier remapping of data stored in a hybrid storage system according to embodiments of the present invention.

FIG. 5, for further explanation, sets forth a flow chart illustrating an exemplary method for supporting dynamic tier remapping of data stored in a hybrid storage system according to embodiments of the present invention. The method of FIG. 5 may be carried out by the storage controller (110) within the computer system (102).

The exemplary method of FIG. 5 is similar to the method of FIG. 3A in that the method of FIG. 5 includes: receiving (302), by the storage controller (110), a read command (382) including a logical block address (384); parsing (304), by the storage controller (110), the logical block address (384) to determine a mapping element and a group identifier; determining (306), by the storage controller (110) and for a particular mapping element of the plurality of elements corresponding to the mapping element of the logical block address (384), whether the particular mapping element is locked; if (308) the particular mapping element is locked, queuing (310), by the storage controller (110), the read command for firmware processing; and if (308) the particular mapping element is not locked, determining (312), by the storage controller (110), from the mapping element whether to modify the group identifier of the logical block address used in performing the read command.

The method of FIG. 5 differs from the method of FIG. 3A, however, in that the method of FIG. 5 further includes: a determination (502) as to whether a notification from the firmware mapping controller (112) has been received, where the notification indicates whether to zero out, or clear, a mapping element statistics table entry corresponding to the mapping element; if (502) the notification has been received, then the storage controller (110) may zero (504) out the mapping element statistics table entry corresponding to the mapping element; otherwise, if (502) the notification has not been received, then the storage controller (110) may instead proceed to continue processing memory operations, and receive (302) another read command.

In some embodiments, the determination (502) as to whether a notification has been received from the firmware mapping controller (112) may be carried out by the storage controller (110) receiving an interrupt event generated by the firmware mapping controller (112), where the interrupt event indicates to the storage controller (110) to zero out (504) a specified mapping element entry within the mapping element statistics table. As discussed above, the firmware mapping controller (112) may determine to generate the interrupt event to zero out a mapping element statistics table entry in response to performing a band swap, and consequently, resetting the access statistics for the band in the new storage device location for the band of data.

In some embodiments, to prevent read/write race conditions, the zeroing out of a mapping element statistics table entry may be restricted to only being done by the storage controller (110), and not the firmware mapping controller (112). In other words, while the firmware mapping controller (112) performs the band swap, the firmware mapping controller (112) does not zero out the mapping element statistics table entry to prevent the firmware mapping controller (112) from writing to the mapping element statistics table while the storage controller (110) may be writing to the mapping element statistics table.

Figure 6:
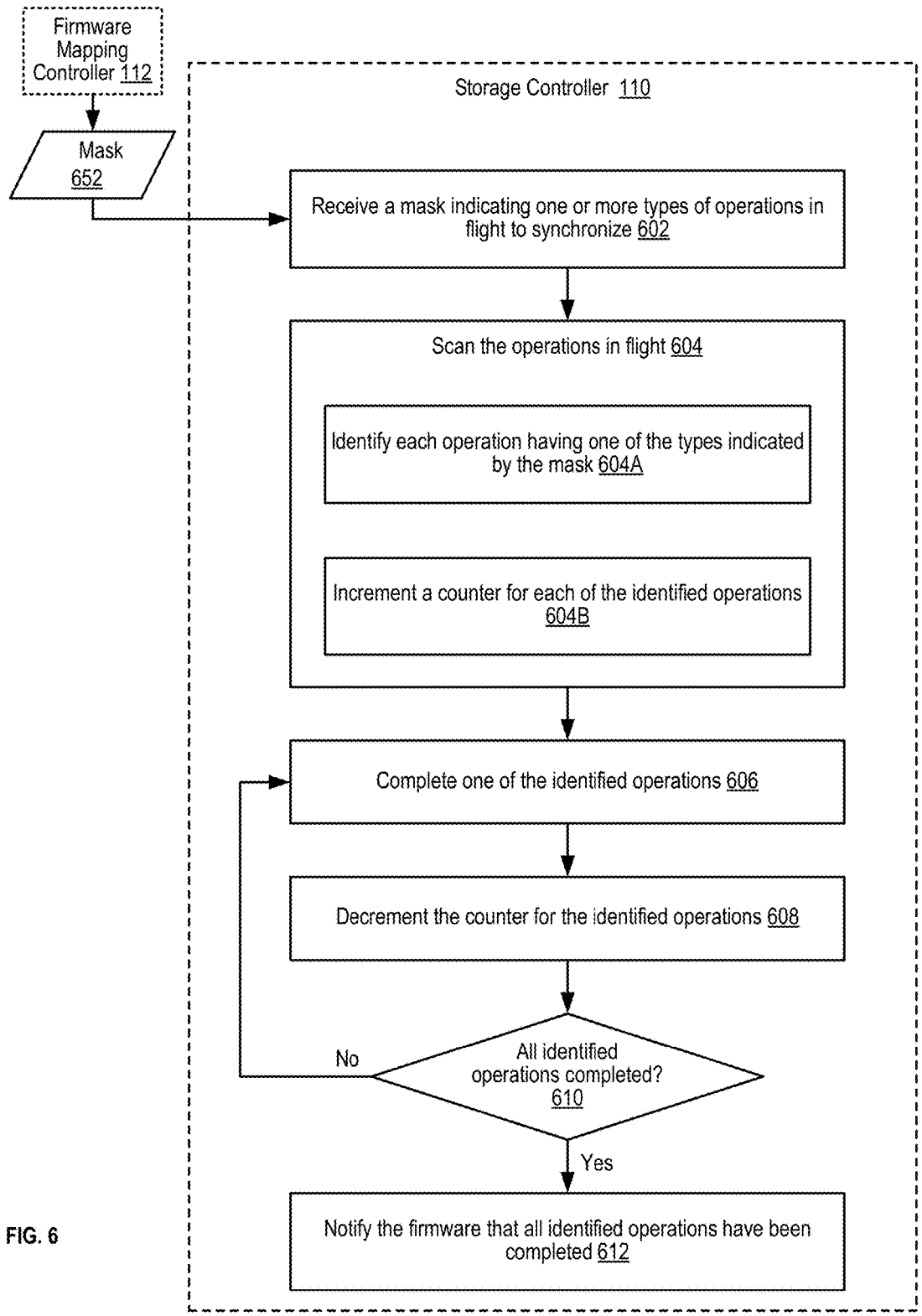
FIG. 6 sets forth a flow chart illustrating an exemplary method for supporting dynamic tier remapping of data stored in a hybrid storage system according to embodiments of the present invention.

FIG. 6, for further explanation, sets forth a flow chart illustrating an exemplary method for supporting dynamic tier remapping of data stored in a hybrid storage system according to embodiments of the present invention. The method of FIG. 6 may be carried out by the storage controller (110) within the computer system (102).

The exemplary method of FIG. 6 includes similar steps as those described above with regard to FIG. 3B. However, the method of FIG. 6 provides additional details of a particular embodiment, including: receiving (602) a mask (652) from the firmware mapping controller (112), where the mask (652) indicates one or more types of operations in flight to synchronize; scanning (604) the operations in flight, where the scanning may include identifying (604A) each operation having one of the types indicated by the mask, and incrementing (604B) a counter for each of the identified operations (604B); completing (606) one of the identified operations; decrementing (608) the counter for the identified operations; determining (610) whether all identified operations have been completed; if (610) all identified operations have not been completed, then the storage controller (110) may continue completing (606) the identified operations; otherwise, if (610) all identified operation have been completed, then the storage controller (110) may notify the firmware mapping controller (112) that all identified operations have been completed.

In some embodiments, the receiving (602) the mask indicating one or more types of operations in flight to synchronize may be carried out by the storage controller reading an interrupt register associated with a SYNC interrupt, where receipt of a SYNC interrupt is discussed above with regard to step (330) of FIG. 3B. In some cases, the firmware mapping controller (112) generates the SYNC interrupt so that a band swap may be performed, but where the firmware mapping controller (112) generates the SYNC interrupt so that the storage controller (110) completes any in flight operations that may refer to a current storage location that may become invalid in response to the firmware mapping controller (112) moving a band of data.

As noted above, in some cases, since only the in flight operations directed to a mapping element that is to be moved would be affected by the firmware mapping controller (112) moving the band of data, in some implementations, the storage controller may, in addition to applying the mask to identify operations, only complete operations directed to the mapping element to be moved instead of completing all currently in flight operations.

In some embodiments, the storage controller (110) may maintain a register for each memory operation to perform, where each register includes a bit, or flag, to indicate the type of operation. In this way, in some embodiments, the storage controller (110) may carry out the scanning (604) of operations in flight by using to mask to determine which bit, or bits, have been set, and carry out identifying (604A) each operation having one of the types indicated by the mask by applying the mask to the registers for each of the memory operations currently being performed by the hardware of the storage controller (110).

In some embodiments, the storage controller (110) may carry out the incrementing (604B) the counter for each of the identified operations as the mask is applied and a determination is made that the in flight operation is one of the identified operations.

In some embodiments, the storage controller (110), given the identified operations, may carry out the completion (606) of one of the identified operations using the hardware components for handling and performing the identified operation, and upon completion of the identified operation, the storage controller (110) may decrement (608) the counter, and continue processing the in flight operations identified using the received mask until all the identified in flight operations have been completed.

In some embodiments, the storage controller (110) may carry out notifying (612) the firmware that all identified operations have been completed by generating a SYNC complete interrupt for the firmware mapping controller (112), where the generation of the SYNC complete interrupt is described above with regard to step (332C) of FIG. 3B.

In this way, once the storage controller (110) completes the in flight operations, the firmware mapping controller (112) may proceed, after receiving the SYNC complete interrupt, to perform a band swap with no risk of any in flight operations accessing a storage location that is mapped to a storage location from which the band was moved. Further, as noted above, any memory operations that are not directed to a locked mapping element may be received and performed by hardware components of the storage controller (110) during the performance of the in flight operations during a synchronization operation.

Exemplary embodiments of the present invention are described largely in the context of a fully functional computer system for supporting dynamic tier remapping of data stored in a hybrid storage system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of supporting dynamic tier remapping of data stored in a hybrid storage system, the hybrid storage system comprising a storage controller and firmware, the firmware maintaining a plurality of mapping elements, each mapping element including a plurality of group identifiers, each group identifier configured to indicate a mapping of a logical block addresses, the method comprising:
   receiving, by a storage controller, a read command including a logical block address;
   parsing, by the storage controller, the logical block address to determine a mapping element and a group identifier included in the logical block address;
   determining, by the storage controller and for a particular mapping element of the plurality of mapping elements maintained in a mapping element table by the firmware corresponding to the mapping element of the logical block address, whether the particular mapping element is locked;
   if the particular mapping element is locked, queuing, by the storage controller, the read command for firmware processing; and
   if the particular mapping element is not locked,
      determining, by the storage controller, from the mapping element whether to modify the group identifier of the logical block address,
      determining, by the storage controller and from a plurality of group identifiers maintained in a remapping table by the firmware corresponding to the group identifier of the logical block address, a remapped group identifier, and
      remapping the logical block address by replacing the group identifier in the logical block address with the remapped group identifier.

2. The method of claim 1, wherein:
   each mapping element corresponds to a counter for each group identifier in the mapping element; and if the particular mapping element is not locked, incrementing, by the storage controller, the counter corresponding to the group identifier parsed from the logical block address;

summing, by the storage controller, the counter values of the statistics element including summing the counter values periodically upon a predefined number of read commands received for which the mapping element is not locked; and if the sum of the counter values exceeds a predefined threshold, providing, by the storage controller to the firmware, statistics corresponding to the mapping element.

3. The method of claim 2, wherein the predefined threshold comprises a value set by the firmware in a hardware register of the storage controller.

4. The method of claim 2, further comprising:
zeroing out a statistics element table responsive to receiving a notification from the firmware in a hardware register.

5. The method of claim 1, wherein:
receiving, by the storage controller from the firmware, a mask indicating one or more types of operations in flight to synchronize;
scanning the operations in flight including:
identifying each operation having one of the types indicated by the mask; and
incrementing a counter for each of the identified operations;
decrementing the counter upon completion of each of the identified operations; and
notifying, by the storage controller, the firmware that all identified operations in flight have been completed.

6. An apparatus for supporting dynamic tier remapping of data stored in a hybrid storage system, the hybrid storage system comprising a storage controller and firmware, the firmware maintaining a plurality of mapping elements, each mapping element including a plurality of group identifiers, each group identifier configured to indicate a mapping of a logical block addresses, the apparatus comprising a computer processor, a non-transitory computer memory operatively coupled to the computer processor, the non-transitory computer memory having disposed within it computer program instructions that, when executed by the computer processor, cause the apparatus to carry out the steps of:
receiving, by a storage controller, a read command including a logical block address;
parsing, by the storage controller, the logical block address to determine a mapping element and a group identifier included in the logical block address;
determining, by the storage controller and for a particular mapping element of the plurality of mapping elements maintained in a mapping element table by the firmware corresponding to the mapping element of the logical block address, whether the particular mapping element is locked;
if the particular mapping element is locked, queuing, by the storage controller, the read command for firmware processing; and
if the particular mapping element is not locked,
determining, by the storage controller, from the mapping element whether to modify the group identifier of the logical block address,
determining, by the storage controller and from a plurality of group identifiers maintained in a remapping table by the firmware corresponding to the group identifier of the logical block address, a remapped group identifier, and
remapping the logical block address by replacing the group identifier in the logical block address with the remapped group identifier.

7. The apparatus of claim 6, wherein:
each mapping element corresponds to a counter for each group identifier in the mapping element; and
if the particular mapping element is not locked, incrementing, by the storage controller, the counter corresponding to the group identifier parsed from the logical block address;
summing, by the storage controller, the counter values of the statistics element including summing the counter values periodically upon a predefined number of read commands received for which the mapping element is not locked; and
if the sum of the counter values exceeds a predefined threshold, providing, by the storage controller to the firmware, statistics corresponding to the mapping element.

8. The apparatus of claim 7, wherein the predefined threshold comprises a value set by the firmware in a hardware register of the storage controller.

9. The apparatus of claim 7, further comprising:
zeroing out a statistics element table responsive to receiving a notification from the firmware in a hardware register.

10. The apparatus of claim 6, wherein:
receiving, by the storage controller from the firmware, a mask indicating one or more types of operations in flight to synchronize;
scanning the operations in flight including:
identifying each operation having one of the types indicated by the mask; and
incrementing a counter for each of the identified operations;
decrementing the counter upon completion of each of the identified operations; and
notifying, by the storage controller, the firmware that all identified operations in flight have been completed.

11. A computer program product for supporting dynamic tier remapping of data stored in a hybrid storage system, the hybrid storage system comprising a storage controller and firmware, the firmware maintaining a plurality of mapping elements, each mapping element including a plurality of group identifiers, each group identifier configured to indicate a mapping of a logical block addresses, the computer program product disposed upon a non-transitory computer readable medium, the computer program product comprising computer program instructions that, when executed, cause a computer to carry out the steps of:
receiving, by a storage controller, a read command including a logical block address;
parsing, by the storage controller, the logical block address to determine a mapping element and a group identifier included in the logical block address;
determining, by the storage controller and for a particular mapping element of the plurality of mapping elements maintained in a mapping element table by the firmware corresponding to the mapping element of the logical block address, whether the particular mapping element is locked;
if the particular mapping element is locked, queuing, by the storage controller, the read command for firmware processing; and
if the particular mapping element is not locked, determining, by the storage controller, from the mapping element whether to modify the group identifier of the logical block address, determining, by the storage controller and from a plurality of group identifiers maintained in a remapping table by the firmware corresponding to the group identifier of the logical block address, a remapped group identifier, and remapping the logical block address by replacing the group identifier in the logical block address with the remapped group identifier.

12. The computer program product of claim 11, wherein the computer readable medium comprises a storage medium.

13. The computer program product of claim 11, wherein:

each mapping element corresponds to a counter for each group identifier in the mapping element; and if the particular mapping element is not locked, incrementing, by the storage controller, the counter corresponding to the group identifier parsed from the logical block address;

summing, by the storage controller, the counter values of the statistics element including summing the counter values periodically upon a predefined number of read commands received for which the mapping element is not locked; and if the sum of the counter values exceeds a predefined threshold, providing, by the storage controller to the firmware, statistics corresponding to the mapping element.

14. The computer program product of claim 13, wherein the predefined threshold comprises a value set by the firmware in a hardware register of the storage controller.

15. The computer program product of claim 13, further comprising:

zeroing out a statistics element table responsive to receiving a notification from the firmware in a hardware register.

16. The computer program product of claim 11, wherein:

receiving, by the storage controller from the firmware, a mask indicating one or more types of operations in flight to synchronize;

scanning the operations in flight including:

identifying each operation having one of the types indicated by the mask; and incrementing a counter for each of the identified operations;

decrementing the counter upon completion of each of the identified operations; and notifying, by the storage controller, the firmware that all identified operations in flight have been completed.

17. The computer program product of claim 16, wherein the storage controller receives additional memory operations during the completion of each of the identified operations.

* * * * *